United States Patent
Lim et al.

(10) Patent No.: US 10,816,701 B2
(45) Date of Patent: Oct. 27, 2020

(54) ANTI-GLARE FILM

(71) Applicant: DONGWOO FINE-CHEM CO., LTD., Iksan-si, Jeollabuk-do (KR)

(72) Inventors: Geo San Lim, Seoul (KR); Songhee Park, Gwangmyeong-si (KR)

(73) Assignee: DONGWOO FINE-CHEM CO., LTD., Ikan-si (KR)

( * ) Notice: Subject to any disclaimer, the term of this patent is extended or adjusted under 35 U.S.C. 154(b) by 0 days.

(21) Appl. No.: 15/535,521

(22) PCT Filed: Jan. 28, 2016

(86) PCT No.: PCT/KR2016/000920
§ 371 (c)(1),
(2) Date: Jun. 13, 2017

(87) PCT Pub. No.: WO2016/126047
PCT Pub. Date: Aug. 11, 2016

(65) Prior Publication Data
US 2017/0351008 A1   Dec. 7, 2017

(30) Foreign Application Priority Data

Feb. 4, 2015 (KR) .................. 10-2015-0017357

(51) Int. Cl.
| | | |
|---|---|---|
| G02B 5/02 | (2006.01) | |
| G02B 1/118 | (2015.01) | |
| G02B 1/18 | (2015.01) | |
| G02B 5/30 | (2006.01) | |

(52) U.S. Cl.
CPC ............ *G02B 5/0226* (2013.01); *G02B 1/118* (2013.01); *G02B 1/18* (2015.01); *G02B 5/0242* (2013.01); *G02B 5/3025* (2013.01)

(58) Field of Classification Search
CPC .... G02B 5/0226; G02B 5/0242; G02B 1/118; G02B 1/11; G02B 1/18
See application file for complete search history.

(56) References Cited

U.S. PATENT DOCUMENTS

| | | | |
|---|---|---|---|
| 2007/0065602 A1* | 3/2007 | Fukuda | G02B 5/0226 |
| | | | 428/1.1 |
| 2007/0121211 A1 | 5/2007 | Watanabe et al. | |
| 2009/0268301 A1* | 10/2009 | Ooe | G02B 5/0226 |
| | | | 359/601 |
| 2010/0027126 A1 | 2/2010 | Chen et al. | |
| 2016/0077240 A1* | 3/2016 | Asahi | G02B 1/118 |
| | | | 428/331 |
| 2016/0237199 A1* | 8/2016 | Yoshida | C08F 290/06 |

FOREIGN PATENT DOCUMENTS

| | | |
|---|---|---|
| CN | 101341427 A | 1/2009 |
| JP | 2006-053538 A | 2/2006 |
| JP | 2007-219485 | 8/2007 |
| JP | 2009-258602 A | 11/2009 |
| JP | 2009-265500 A | 11/2009 |
| JP | 2011-174976 A | 9/2011 |
| KR | 10-2011-0124376 A | 11/2011 |
| WO | WO-2014185314 A1 * | 11/2014 ............. G02B 1/118 |

OTHER PUBLICATIONS

Machine translation of WO2014185314, obtained from espacenet Sep. 28, 2018 (Year: 2018).*
Machine translation of JP-2007219485, downloaded from ESPACENET Apr. 8, 2020 (Year: 2020).*
International Search Report for PCT/KR2016/000920 dated Jun. 13, 2016 [PCT/ISA/210].
Written Opinion for PCT/KR2016/000920 dated Jun. 13, 2016 [PCT/ISA/237].
The State Intellectual Property Office of People'S Republic of China; Communication dated Nov. 14, 2018 in counterpart application No. 201680005503.5.
Communication from Japan Patent Office dated Sep. 3, 2019 in JP Application No. 2017-538215.

* cited by examiner

*Primary Examiner* — Cara E Rakowski
(74) *Attorney, Agent, or Firm* — Sughrue Mion, PLLC

(57) ABSTRACT

The present invention provides an anti-glare film for touch-mode displays, which has good blackness and touch feel, and a polarizing plate and an image display device comprising the same.

6 Claims, No Drawings

ANTI-GLARE FILM

CROSS REFERENCE TO RELATED APPLICATIONS

This application is a National Stage of International Application No. PCT/KR2016/000920 filed Jan. 28, 2016, claiming priority based on Korean Patent Application No. 10-2015-0017357 filed Feb. 4, 2015, the contents of all of which are incorporated herein by reference in their entirety.

TECHNICAL FIELD

The present invention relates to an anti-glare film, and a polarizing plate and an image display device comprising the same. Particularly, the present invention provides an anti-glare film for touch-type displays, which has good blackness and touch feel, and a polarizing plate and an image display device comprising the same.

BACKGROUND ART

An anti-glare film functions to reduce the reflection of external light by diffuse-reflection through its surface protrusions, and it has been used in a surface of various display panels, e.g., a liquid crystal display (LCD), a plasma display panel (PDP), a cathode ray tube (CRT), and an electroluminescence (EL) display for the purpose of preventing contrast deterioration due to the reflection of external light or preventing the visibility deterioration of the displays due to image reflection.

Among conventional anti-glare films, anti-glare films having severe unevenness on their surface undergoes excessive diffuse-reflection of external light, which may give good anti-glare property but may deteriorate blackness to reduce the contrast ratio of image to be displayed. On the contrary, anti-glare films having slight unevenness on their surface fail to induce sufficient diffuse-reflection of external light to give poor anti-glare property, thereby considerably deteriorating display visibility.

Recently, various display devices adopt a touch input mode which is regarded as a next-generation input technique, and the touch-mode displays are required to use an anti-glare film capable of providing good touch feel to users, while maintaining blackness.

Korean Patent Application Publication No. 2011-0124376 discloses an anti-glare laminate which has anti-glare properties and can realize excellent prevention of dazzling and reproduction of black color. However, such patent does not describe any anti-glare laminate having touch feel which can be applied in touch-mode displays.

DISCLOSURE

Technical Problem

It is an object of the present invention to provide an anti-glare film for touch-mode displays, which has good blackness and touch feel.

It is another object of the present invention to provide a polarizing plate comprising the anti-glare film.

It is still another object of the present invention to provide an image display device comprising the anti-glare film.

Technical Solution

In accordance with one aspect of the present invention, there is provided an anti-glare film, satisfying Equations 1 to 3:

$$A^2+B>105 \tag{1}$$

$$\text{Surface haze}<6\% \tag{2}$$

$$\text{Total haze}<15\% \tag{3}$$

wherein,

A is an absolute value of the surface haze, and

B is an absolute value of a water contact angle.

In one embodiment of the present invention, the anti-glare film may comprise a transparent substrate and an anti-glare coating layer formed on the transparent substrate.

In one embodiment of the present invention, the anti-glare coating layer may be formed by applying an anti-glare coating composition on the transparent substrate.

In one embodiment of the present invention, the anti-glare coating composition may comprise a light-transmitting resin, light-transmitting particles, a photoinitiator and a solvent.

In one embodiment of the present invention, the light-transmitting particles may have an average diameter of 1 to 10 µm.

In accordance with another aspect of the present invention, there is provided a polarizing plate comprising the anti-glare film.

In accordance with still another aspect of the present invention, there is provided an image display device comprising the anti-glare film.

Advantageous Effects

The anti-glare film of the present invention has good touch feel and blackness without the deterioration of image quality, and it can be effectively used in a polarizing plate for touch-mode displays and an image display device.

BEST MODE

The present invention is, hereinafter, described in more detail.

One embodiment of the present invention relates to an anti-glare film, satisfying Equations 1 to 3:

$$A^2+B>105 \tag{1}$$

$$\text{Surface haze}<6\% \tag{2}$$

$$\text{Total haze}<15\% \tag{3}$$

wherein,

A is an absolute value of the surface haze, and

B is an absolute value of a water contact angle.

As used herein, the haze may be shown in JIS K 7105: 1981, "Test methods for optical properties of plastics", and the haze may be measured according to JIS K 7136:2000, "Plastics—Determination of haze for transparent materials". The haze is defined in Equation 4.

$$\text{Haze}=(\text{Diffusion transmittance/Total transmittance})\times 100(\%) \tag{4}$$

As used herein, the water contact angle refers to an angle between a boundary of a liquid drop and a bottom surface, and a method for measuring the water contact angle of an anti-glare film is not particularly limited in the present invention. For example, the water contact angle may be measured by the method which will be described in Experimental Examples below.

In one embodiment of the present invention, the sum of the surface haze of the anti-glare film squared and the water contact angle, i.e., the value of $(A^2+B)$ is controlled to exceed 105, thereby improving the touch feel of the anti-glare film. Particularly, when the value of ($A^2+B$) satisfies Equation 5, the touch feel of the anti-glare film can be surprisingly improved.

$$105 < A^2 + B < 150 \tag{5}$$

Also, the surface haze is controlled to be less than 6%, preferably less than 3%, and the total haze is controlled to be less than 15%, which allows the maintenance of good blackness without the deterioration of image quality.

The anti-glare film satisfying Equations 1 to 3 and 5 may be easily prepared by controlling the type and composition of components in the anti-glare coating composition as described below, the coating thickness, and the type and thickness of the transparent substrate.

The anti-glare film according to one embodiment of the present invention comprises a transparent substrate and an anti-glare coating layer formed on the transparent substrate.

In one embodiment of the present invention, the transparent substrate may be any plastic film having transparency. For example, it may be made of any one selected from cycloolefin derivatives having cycloolefin monomer units such as norbornene or polycyclic norbornene monomers, cellulose (diacetylcellulose, triacetylcellulose, acetylcellulosebutylate, isobutylestercellulose, propionylcellulose, butyryl cellulose, acetylpropionylcellulose), ethylene-vinyl acetate copolymer, polyester, polystyrene, polyamide, polyetherimide, polyacrylate, polyimide, polyethersulfone, polysulfone, polyethylene, polypropylene, polymethylpentene, polyvinyl chloride, polyvinylidene chloride, polyvinyl alcohol, polyvinyl acetal, polyetherketone, polyetherether ketone, polyether sulfone, polymethyl methacrylate, polyethylene terephthalate, polybutylene terephthalate, polyethylene naphthalate, polycarbonate, polyurethane and epoxy. Also, the substrate may be non-stretched or a uniaxially or biaxially stretched films.

Among the illustrated examples of the transparent substrate, uniaxially or biaxially stretched polyester films that have good transparency and heat resistance, films of cycloolefin derivatives that have good transparency and heat resistance and can meet the enlargement of films, or triacetylcellulose films having transparency without optical anisotropy, may be suitably used.

The transparent substrate may have a thickness of 8 to 1000 μm, specifically 40 to 100 μm, but is not limited thereto. If the thickness of the transparent substrate is less than 8 μm, the strength of a film may decrease to deteriorate processability. If the thickness of the transparent substrate is higher than 1000 μm, transparency may become poor or the weight of a polarizing plate may increase.

In one embodiment of the present invention, the anti-glare coating layer may be formed by applying an anti-glare coating composition on the transparent substrate.

In one embodiment of the present invention, the anti-glare coating composition may comprise a light-transmitting resin, light-transmitting particles, a photoinitiator and a solvent.

In one embodiment of the present invention, the light-transmitting resin may be a photocurable resin. The photocurable resin may comprise photocurable (meth)acrylate oligomer and/or monomer.

The photocurable (meth)acrylate oligomer may be epoxy (meth)acrylate or urethane (meth)acrylate. Among these, the urethane (meth)acrylate is preferably used.

The urethane (meth)acrylate may be obtained by reaction of multi-functional (meth)acrylate having a hydroxyl group and a compound having an isocyanate group in the presence of a catalyst. Specifically, the multi-functional (meth)acrylate having a hydroxyl group may be at least one selected from the group consisting of 2-hydroxyethyl(meth)acrylate, 2-hydroxyisopropyl(meth)acrylate, 4-hydroxybutyl(meth)acrylate, caprolactone ring-opening hydroxyacrylate, a pentaerythritol tri/tetra(meth)acrylate mixture, and a dipentaerythritol penta/hexa(meth)acrylate mixture. Also, the compound having an isocyanate group may be at least one selected from the group consisting of 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexenediisocyanate, 4,4'-methylenebis(cyclohexylisocyanate), isophoronediisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2, 6-dimethyphenylisocyanate), 4,4'-oxybis(phenylisocyanate), tri-functional isocyanate derived from hexamethylenediisocyanate, and trimethane propanol adduct of toluenediisocyanate.

The monomer may be any one which has been conventionally used in the art. For example, monomers having an unsaturated group such as (meth)acryloyl, vinyl, styryl and allyl as a photocurable functional group may be used. Among these, the monomer having a (meth)acryloyl group is preferably used.

Specifically, the monomer having a (meth)acryloyl group may be at least one selected from the group consisting of neopentyl glycol acrylate, 1,6-hexanediol (meth)acrylate, propylene glycol di(meth)acrylate, triethylene glycol di(meth)acrylate, dipropylene glycol di(meth)acrylate, polyethylene glycol di(meth)acrylate, polypropylene glycol di(meth)acrylate, trimethylolpropane tri(meth)acrylate, trimethylolethane tri(meth)acrylate, 1,2,4-cyclohexane tetra(meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexatri(meth)acrylate, bis(2-hydroxyethyl)isocyanurate di(meth)acrylate, hydroxyethyl (meth)acrylate, hydroxypropyl (meth)acrylate, hydroxybutyl (meth)acrylate, isooctyl (meth)acrylate, isodecyl (meth)acrylate, stearyl (meth)acrylate, tetrahydrofurfuryl (meth)acrylate, phenoxyethyl (meth)acrylate, and isoborneol (meth)acrylate.

The photocurable (meth)acrylate oligomers and monomers as illustrated above as the light-transmitting resin may be used alone or in combination of two or more.

The light-transmitting resin may be present in an amount of 1 to 80 parts by weight based on 100 parts by weight of the anti-glare coating composition, but is not limited thereto. If the amount of the light-transmitting resin is less than 1 part by weight, it is difficult to obtain sufficient hardness improvement. If the amount of the light-transmitting resin is higher than 80 parts by weight, severe curling may be generated.

In one embodiment of the present invention, the light-transmitting particles are any one which has been conventionally used in the art for the purpose of providing anti-glare property. For example, the light-transmitting particles may be particles of silica, silicone resins, melamine resins, acrylate resins, styrene resins, acrylic styrene resins, polycarbonate resins, polyethylene resins and vinyl chloride resins.

The above particles illustrated as the light-transmitting particles may be used alone or in combination of two or more.

The light-transmitting particles may have an average diameter of 1 to 10 μm. If the average diameter of the particles is smaller than 1 μm, it is difficult to form protrusions on the surface of the anti-glare coating layer, thereby reducing anti-glare property. If the average diameter of the particles is larger than 10 μm, it renders the surface of the anti-glare coating layer rough, thereby deteriorating visibility.

The light-transmitting particles may be present in an amount of 0.5 to 20 parts by weight based on 100 parts by weight of the anti-glare coating composition. If the amount of the light-transmitting particles is less than 0.5 parts by weight, anti-glare property is reduced. If the amount of the light-transmitting particles is higher than 20 parts by weight, it may cause the whiteness of the anti-glare coating layer.

In one embodiment of the present invention, the photoinitiator may be any one which has been conventionally used in the art. Specifically, the photoinitiator may be at least one selected from the group consisting of 2-methyl-1-[4-(methylthio)phenyl]-2-morpholinepropanone-1, diphenylketone, benzyldimethylketal, 2-hydroxy-2-methyl-1-phenyl-1-one, 4-hydroxycyclophenylketone, dimethoxy-2-phenyl-acetophenone, anthraquinone, fluorene, triphenylamine, carbazole, 3-methylacetophenone, 4-chloroacetophenone, 4,4-dimethoxyacetophenone, 4,4-diaminobenzophenone, 1-hydroxycyclohexylphenylketone and benzophenone.

The photoinitiator may be present in an amount of 0.1 to 10 parts by weight based on 100 parts by weight of the anti-glare coating composition. If the amount of the photoinitiator is less than 0.1 parts by weight, a curing rate may be lowered. If the amount of the photoinitiator is higher than 10 parts by weight, it cause cracks in the the anti-glare coating layer due to overcuring.

In one embodiment of the present invention, the solvent may be any one which has been conventionally used in the art. Specifically, alcohols (e.g., methanol, ethanol, isopropanol, butanol, methyl cello solve, ethyl cellosolve, 1-methoxy-2-propanol, propylene glycol monomethyl ether and the like), ketones (e.g., methyl ethyl ketone, methyl butyl ketone, methyl isobutyl ketone, diethyl ketone, dipropyl ketone, cyclohexanone and the like), hexanes (hexane, heptane, octane and the like) and benzenes (benzene, toluene, xylene and the like) may be used. The solvents illustrated above may be used alone or in combination of two or more.

The solvent may be present in an amount of 10 to 95 parts by weight based on 100 parts by weight of the anti-glare coating composition. If the amount of the solvent is less than 10 parts by weight, viscosity increases to deteriorate processibility. If the amount of the solvent is higher than 95 parts by weight, the time of curing process becomes longer and unecomonical aspect is resulted.

In one embodiment of the present invention, the anti-glare coating composition may optionally comprise further components which have been conventionally used in the art, for example, an antioxidant, a UV absorbent, a photo-stabilizer, a thermal polymerization inhibitor, a leveling agent, a surfactant, a lubricant, and an antifouling agent.

The anti-glare coating layer may be formed by applying the anti-glare coating composition on one or both surfaces of a transparent substrate, and drying the coatings followed by UV curing.

The coating process of the anti-glare coating composition may be suitably carried out using die, air knife, reverse roll, spraying, blade, casting, gravure, micro gravure and spin coating coaters on the transparent substrate.

After applying the anti-glare coating composition on the transparent substrate, a drying process may be carried out by vaporizing volatiles at a temperature of 30 to 150° C. for 10 seconds to one hour, more specifically 30 seconds to 30 minutes, followed by UV curing. The UV curing may be carried out by the irradiation of UV-rays at about 0.01 to 10 $J/cm^2$, particularly 0.1 to 2 $J/cm^2$.

The formed anti-glare coating layer may have a thickness of specifically 1 to 30 μm, more specifically 1.5 to 10 μm. When the thickness of the coating layer satisfies such range, good hardness can be obtained.

One embodiment of the present invention relates to a polarizing plate comprising the anti-glare film as described above. The polarizing plate according to one embodiment of the present invention may be prepared by laminating the anti-glare film on at least one surface of a polarizing film.

The polarizing film is not particularly limited. For example, it may include a uniaxially stretched film obtained by adsorbing a dichroic material such as iodine or a dichroic dye on a hydrophilic polymer film such as a polyvinyl alcohol-based film and a partially saponified ethylene-vinyl acetate copolymer film, and polyene-based aligned film such as a dehydrated product of polyvinyl alcohol or a dechlorinated product of poly vinyl chloride. Specifically, the polarizing film consisting of a polyvinyl alcohol-based film and a dichroic material such as iodine may be used. The thickness of the polarizing film is not particularly limited, but it may generally ranges from 5 to 80 μm.

One embodiment of the present invention relates to an image display device comprising the anti-glare film, particularly an image display device of touch input mode.

The image display device of the present invention may comprise components known in the art, in addition to the polarizing plate.

The anti-glare film according to one embodiment of the present invention may be used in liquid crystal devices (LCDs) of various operation modes, including reflective, transmissive, transflective, twisted nematic (TN), super-twisted nematic (STN), optically compensated bend (OCB), hybrid-aligned (HAN), vertical alignment (VA)-type and in-plane switching (IPS) LCDs. Also, the anti-glare film according to one embodiment of the present invention may be used in various image display devices, including plasma displays, field emission displays, organic EL displays, inorganic EL displays, electronic paper and the like.

The present invention is further illustrated by the following examples, comparative examples and experimental examples, which are not to be construed to limit the scope of the invention.

Preparation Example 1: Preparation of Anti-Glare Coating Composition

15 Parts by weight of urethane acrylate (SC2153, Miwon Speciality Chemicals), 15 parts by weight of pentaerythritol triacrylate (M340, Miwon Speciality Chemicals), 1 part by weight of light-transmitting particles (acrylic styrene copolymer, refractive index of 1.51, average diameter of 4.5 μm), 30 parts by weight of methyl ethyl ketone (Daejung Chemicals & Materials), 36 parts by weight of propylene glycol monomethyl ether (Daejung Chemicals & Materials), 2.5 parts by weight of a photoinitiator (1-184, Ciba), and 0.5 parts by weight of an antifouling agent (Optool™ DAC-HP, Daikin) were mixed using an agitator and filtered through a filter of polypropylene to obtain an anti-glare coating composition.

Preparation Example 2: Preparation of Anti-Glare Coating Composition

15 Parts by weight of urethane acrylate (SC2153, Miwon Speciality Chemicals), 15 parts by weight of pentaerythritol triacrylate (M340, Miwon Speciality Chemicals), 1 part by weight of light-transmitting particles (acrylic styrene copolymer, refractive index of 1.55, average diameter of 4.5 μm), 30 parts by weight of methyl ethyl ketone (Daejung Chemicals & Materials), 36 parts by weight of propylene glycol monomethyl ether (Daejung Chemicals & Materials), 2.5 parts by weight of a photoinitiator (1-184, Ciba), and 0.5 parts by weight of an antifouling agent (Optool™ DAC-HP, Daikin) were mixed using an agitator and filtered through a filter of polypropylene to obtain an anti-glare coating composition.

Preparation Example 3: Preparation of Anti-Glare Coating Composition

15 Parts by weight of urethane acrylate (SC2153, Miwon Speciality Chemicals), 15 parts by weight of pentaerythritol triacrylate (M340, Miwon Speciality Chemicals), 1 part by weight of light-transmitting particles (acrylic styrene copolymer, refractive index of 1.51, average diameter of 4.5 μm), 30 parts by weight of methyl ethyl ketone (Daejung Chemicals & Materials), 36 parts by weight of propylene glycol monomethyl ether (Daejung Chemicals & Materials), 2.5 parts by weight of a photoinitiator (1-184, Ciba), and 0.5 parts by weight of a leveling agent (BYK-3530, BYK) were mixed using an agitator and filtered through a filter of polypropylene to obtain an anti-glare coating composition.

Examples 1 to 5 and Comparative Examples 1 to 3: Preparation of Anti-glare Film

Each of the anti-glare coating compositions obtained in Preparation Examples 1 to 3 was coated on a 60 μm-thick tryacetyl cellulose film by controlling a coating thickness so that each value of surface haze and water contact angle satisfies those listed in Table 1. Then, the coating was dried at 70° C. for 2 minutes to vaporize the used solvent. The dried film was cured by UV irradiation at 400 mJ/cm² to prepare an anti-glare film.

Experimental Example 1

The anti-glare films prepared above were measured for their properties as follows, and the results thereof are shown in Table 1.

(1) Haze (%)

The surface haze and the total haze of each film were measured using HM-150 Haze Meter (MURAKAMI). The total haze was directly measured on the prepared anti-glare film. The surface haze was calculated as a difference between the total haze and a value of haze being measured in the state that a transparent protective film was attached on the coating layer of the film to eliminate the scattering by surface protrusions.

(2) Water Contact Angle (°)

A water drop was dropped on the surface of the anti-glare film at room temperature (25° C.). After 1 minute, left and right contact angles for the water drop were measured using an instrument CAM100 (KSV). The measurement was carried out 3 times per a sample to determine an average value of the measured water contact angles.

(3) Blackness

The anti-glare film was attached on a black acrylic plate to prepare a sample, wherein the coating surface of the film was faced upwards. The sample was placed under a 3-wavelength fluorescent lamp and the blackness was visually evaluated by inspecting of the reflected image of the fluorescent lamp 5 cm apart from the sample.

<Evaluation Criteria>

1: Overall gray color was exhibited and lines of the fluorescent lamp cannot be confirmed due to severe scattering 2: Overall gray color was exhibited but lines of the fluorescent lamp can be confirmed 3: Overall black color was exhibited and lines of the fluorescent lamp can be confirmed 4: Overall black color was exhibited and lines of the fluorescent lamp can be vaguely confirmed (4) Touch Feel The anti-glare film was touched by hand with 10 cycles of left-right movements at the distance of 10 cm. A higher score was given for more smooth touch feel.

<Evaluation Criteria>

5: Best Smoothness

1: Stop of hand movement due to stiffness

TABLE 1

| | Anti-glare Coating Composition | Surface Haze (A) | Water Contact Angle (B) | $A^2 + B$ | Total Haze | Blackness | Touch Feel |
|---|---|---|---|---|---|---|---|
| Example 1 | Preparation Example 1 | 1.3 | 104 | 105.69 | 2.1 | 4 | 4 |
| Example 2 | Preparation Example 1 | 2.1 | 106 | 110.41 | 3.4 | 4 | 4 |
| Example 3 | Preparation Example 1 | 4.4 | 105 | 124.36 | 6.0 | 3 | 5 |
| Example 4 | Preparation Example 2 | 2.3 | 107 | 112.29 | 8.8 | 4 | 4 |
| Example 5 | Preparation Example 2 | 4.9 | 105 | 129.01 | 11.2 | 3 | 5 |
| Com. Example 1 | Preparation Example 1 | 20.2 | 104 | 512.04 | 22.1 | 1 | 5 |
| Com. Example 2 | Preparation Example 3 | 1.5 | 72 | 74.25 | 2.9 | 4 | 1 |
| Com. Example 3 | Preparation Example 3 | 18.2 | 74 | 405.24 | 20.7 | 1 | 5 |

As shown in Table 1, the anti-glare films of Examples 1 to 5 according to the present invention that satisfy Equations 1 to 3 had good blackness and touch feel. In contrast, the anti-glare films of Comparative Examples 1 and 3 that do not satisfy Equations 2 and 3 had very poor blackness, and the anti-glare film of Comparative Example 2 that does not satisfy Equation 1 had very poor touch feel.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

The invention claimed is:

1. An anti-glare film for a touch-mode display, satisfying Equations (2), (3), and (5), wherein the anti-glare film comprises a transparent substrate and a single coating layer composed of an anti-glare coating layer formed by applying an anti-glare coating composition on the transparent substrate, wherein the anti-glare coating composition comprises a light-transmitting resin, light-transmitting particles having an average diameter of 1 to 10 µm, a photoinitiator, and a solvent:

$$1.3\% \leq \text{Surface haze} < 6\% \quad (2)$$

$$2.1\% \leq \text{Total haze} < 15\% \quad (3)$$

$$105 < A^2 + B < 150 \quad (5)$$

wherein,

A is an absolute value of the surface haze percentage, and

B is an absolute value of a water contact angle in degrees.

2. The anti-glare film of claim 1, wherein the surface haze is less than 3%.

3. A polarizing plate comprising the anti-glare film of claim 2.

4. An image display device comprising the anti-glare film of claim 2.

5. A polarizing plate comprising the anti-glare film of claim 1.

6. An image display device comprising the anti-glare film of claim 1.

* * * * *